United States Patent
Karve et al.

(10) Patent No.: US 10,942,747 B2
(45) Date of Patent: Mar. 9, 2021

(54) HEAD AND TAIL POINTER MANIPULATION IN A FIRST-IN-FIRST-OUT ISSUE QUEUE

(71) Applicant: International Business Machines Corporation, Armonk, NY (US)

(72) Inventors: Mohit S. Karve, Austin, TX (US); Joel A. Silberman, Somers, NY (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/826,738

(22) Filed: Nov. 30, 2017

(65) Prior Publication Data

US 2019/0163488 A1 May 30, 2019

(51) Int. Cl.
*G06F 9/38* (2018.01)

(52) U.S. Cl.
CPC .......... *G06F 9/3855* (2013.01); *G06F 9/3836* (2013.01); *G06F 9/3867* (2013.01)

(58) Field of Classification Search
CPC .................................................... G06F 9/3836
See application file for complete search history.

(56) References Cited

U.S. PATENT DOCUMENTS

| | | |
|---|---|---|
| 5,655,096 A | 8/1997 | Branigin |
| 5,689,674 A | 11/1997 | Griffith et al. |
| 5,710,902 A | 1/1998 | Sheaffer et al. |
| 6,065,105 A | 5/2000 | Zaidi |
| 6,336,183 B1 | 1/2002 | Le et al. |
| 6,425,074 B1 | 7/2002 | Meier et al. |
| 6,463,523 B1 | 10/2002 | Kessler et al. |

(Continued)

FOREIGN PATENT DOCUMENTS

| | | |
|---|---|---|
| CN | 101034345 A | 9/2007 |
| CN | 102360309 A | 2/2012 |

OTHER PUBLICATIONS

Daniele Folegnani and Antonio Gonzalez. "Energy-Effective Issue Logic" ISCA '01 Proceedings of the 28th annual international symposium on Computer architecture, pp. 230-239 (Year: 2001).*

(Continued)

*Primary Examiner* — Jacob Petranek
(74) *Attorney, Agent, or Firm* — Cantor Colburn LLP; Jason Sosa

(57) ABSTRACT

Aspects of the invention include tracking relative ages of instructions in a first-in-first-out (FIFO) issue queue of an out-of-order (OoO) processor. The FIFO issue queue is configured to add instructions to the issue queue in a sequential order and to remove instructions from the issue queue in any order including a non-sequential order. The tracking of relative ages of instructions includes maintaining a head pointer to a location of an oldest instruction in the issue queue and a tail pointer to a location of a last instruction added to the issue queue. It is determined periodically whether the tail pointer is pointing to a location that includes a valid instruction. The tail pointer is updated to point to a previous sequential location in the issue queue based at least in part on determining that the tail pointer is not pointing to a location that corresponds to a valid instruction.

12 Claims, 10 Drawing Sheets

(56) References Cited

U.S. PATENT DOCUMENTS

| | | | |
|---|---|---|---|
| 6,553,480 | B1 | 4/2003 | Cheong |
| 6,557,095 | B1 | 4/2003 | Henstrom |
| 6,728,866 | B1 | 4/2004 | Kahle et al. |
| RE38,599 | E | 9/2004 | Tremblay |
| 6,862,676 | B1 | 3/2005 | Knapp et al. |
| 6,931,639 | B1 * | 8/2005 | Eickemeyer .......... G06F 9/3802 712/228 |
| 6,988,183 | B1 | 1/2006 | Wong |
| 6,988,186 | B2 | 1/2006 | Eickemeyer et al. |
| 7,133,925 | B2 | 11/2006 | Mukherjee et al. |
| 7,219,249 | B1 * | 5/2007 | Ghose ................... G06F 1/3203 713/324 |
| 7,464,253 | B2 | 12/2008 | Viedenbaum et al. |
| 7,472,258 | B2 | 12/2008 | Burky |
| 7,689,812 | B2 | 3/2010 | Abernathy et al. |
| 8,127,116 | B2 | 2/2012 | Islam et al. |
| 3,285,974 | A1 | 10/2012 | Singh et al. |
| 8,392,672 | B1 | 3/2013 | Rhoades et al. |
| 8,521,998 | B2 | 8/2013 | Albernathy et al. |
| 8,667,260 | B2 | 3/2014 | Eichenberger et al. |
| 8,930,432 | B2 | 1/2015 | Hickey et al. |
| 9,047,079 | B2 | 6/2015 | Bruce et al. |
| 9,058,180 | B2 | 6/2015 | Golla et al. |
| 9,146,774 | B2 | 9/2015 | Busaba et al. |
| 9,158,573 | B2 | 10/2015 | Busaba et al. |
| 9,298,466 | B2 | 3/2016 | Buyuktosunoglu et al. |
| 9,489,207 | B2 | 11/2016 | Burky et al. |
| 9,513,924 | B2 | 12/2016 | Gschwind et al. |
| 9,619,383 | B2 | 4/2017 | Busaba et al. |
| 2002/0053038 | A1 * | 5/2002 | Buyuktosunoglu ... G06F 1/3203 713/320 |
| 2003/0069920 | A1 | 4/2003 | Melvin et al. |
| 2004/0177239 | A1 | 9/2004 | Clift et al. |
| 2004/0215938 | A1 | 10/2004 | Burky |
| 2005/0038979 | A1 | 2/2005 | Fischer et al. |
| 2005/0243734 | A1 | 11/2005 | Nemirovsky et al. |
| 2006/0095732 | A1 | 5/2006 | Tran |
| 2009/0100249 | A1 | 4/2009 | Eichenberger et al. |
| 2009/0113181 | A1 | 4/2009 | Comparan et al. |
| 2009/0276608 | A1 | 11/2009 | Shimada |
| 2010/0095087 | A1 | 4/2010 | Eichenberger et al. |
| 2010/0161942 | A1 | 6/2010 | Bishop |
| 2010/0262806 | A1 | 10/2010 | Doing |
| 2011/0153986 | A1 | 6/2011 | Alexander et al. |
| 2011/0302392 | A1 | 12/2011 | Abernathy et al. |
| 2012/0233441 | A1 | 9/2012 | Barreh |
| 2013/0205118 | A1 * | 8/2013 | Buyuktosunoglu ... G06F 9/3844 712/206 |
| 2014/0351562 | A1 | 11/2014 | Spadini |
| 2015/0106595 | A1 * | 4/2015 | Khot .................... G06F 9/3836 712/215 |
| 2015/0220342 | A1 | 8/2015 | Glossner |
| 2016/0117172 | A1 | 4/2016 | Alexander et al. |
| 2016/0202988 | A1 | 7/2016 | Ayub et al. |
| 2017/0132010 | A1 | 5/2017 | Vasekin et al. |
| 2017/0235577 | A1 | 8/2017 | Brownscheidle |
| 2017/0344374 | A1 | 11/2017 | Friedmann |
| 2018/0232234 | A1 | 8/2018 | Alexander |
| 2019/0163482 | A1 | 5/2019 | Silberman |
| 2019/0163483 | A1 | 5/2019 | Silberman |
| 2019/0163484 | A1 | 5/2019 | Silberman |
| 2019/0163485 | A1 | 5/2019 | Karve |
| 2019/0163486 | A1 | 5/2019 | Sinharoy |
| 2019/0163488 | A1 | 5/2019 | Karve |
| 2019/0163489 | A1 | 5/2019 | Karve |
| 2019/0163490 | A1 | 5/2019 | Silberman |
| 2019/0163491 | A1 | 5/2019 | Silberman |
| 2020/0150969 | A1 | 5/2020 | Silberman et al. |

OTHER PUBLICATIONS

Joel A. Silberman, et al., Pending U.S. Appl. No. 15/826,734 entitled "Scalable Dependency Matrix With a Single Summary Bit in an Out-Of-Order Processor," filed with the U.S. Patent and Trademark Office dated Nov. 30, 2017.

Joel A. Silberman, et al., Pending U.S. Appl. No. 15/826,742 entitled "Scalable Dependency Matrix With Wake-Up Columns for Long Latency Instructions in an Out-Of-Order Processor," filed with the U.S. Patent and Trademark Office dated Nov. 30, 2017.

Joel A. Silberman, et al., Pending U.S. Appl. No. 15/826,746 entitled "Scalable Dependency Matrix With Multiple Summary Bits in an Out-Of-Order Processor," filed with the U.S. Patent and Trademark Office dated Nov. 30, 2017.

Joel A. Silberman, et al., Pending U.S. Appl. No. 15/826,754 entitled "Completing Coalesced Global Completion Table Entries in an Out-Of-Order Processor," filed with the U.S. Patent and Trademark Office datec Nov. 30, 2017.

Joel A. Silberman, et al.., Pending U.S. Appl. No. 15/826,752 entitled "Coalescing Global Completion Table Entries in an Out-Of-Order Processor," filed with the U.S. Patent and Trademark Office dated Nov. 30, 2017.

List of IBM Patents or Patent Applictions Treated As Related; (Appendix P), Filed Nov. 30, 2017.

Mohit S. Karve, et al., Pending U.S. Appl. No. 15/826,740 entitled "Block Based Allocation and Deallocation of Issue Queue Entries," filed with the U.S. Patent and Trademark Office dated Nov. 30, 2017.

U.S. Appl. No. 15/826,741, filed Nov. 30, 2017, Entitled: Buffered Instruction Dispatching to an Issue Queue, First Named Inventor: Mohit S. Karve.

U.S. Appl. No. 15/826,745, filed Nov. 30, 2017, Entitled: Issue Queue With Dynamic Shifting Between Ports, First Named Inventor: Balaram Sinharoy.

Akkary et al., "Checkpoint processing and recovery: Towards scalable large instruction window processors." Microarchitecture, 2003. MICRO-36. Proceedings. 36th Annual IEEE/ACM International Symposium on. IEEE, 2003, 12 pages.

Alastruey et al. "Selection of the Register File Size and the Resource Allocation Policy on SMT Processors." Computer Architecture and High Performance Computing, 2008. SBAC-PAS'08. 20th International Symposium on. IEEE, 2008, 8 pages.

Anonymously; "An extensible, scalable, optimized multithreaded data loading framework for software applications"; http:ip.com/IPCOM/000240374D; Jan. 28, 2015, 8 pages.

Anonymously; "Method and Apparatus for Hardware Assisted Function Shipping"; http://ip.com/IPCOM/000199436D; Sep. 3, 2010, 7 pages.

Anonymously; "System of Programmable Mode Control within an Instruction Sequencing Unit for Management of Power within a Microprocessor"; http://ip.com/IPCOM/000217762D; May 11, 2012, 2 pages.

Anonymously; "VSU/FXU Powergating"; http://ip.com/IPCOM/000216899D; Apr. 23, 2012, 2 pages.

Duong et al., "Compiler Assisted Out-Of-Order Instruction Commit." Center for Embedded Computer Systems, University of California, Irvine (2010), 27 pages.

Ergin et al. "Increasing processor performance through early register release." Computer Design: VLSI in Computers and Processors, 2004. ICCD 2004. Proceedings. IEEE International Conference on. IEEE, 2004, 8 pages.

Herlihy et al., . Transactional memory: Architectural support for lock-free data structures. vol. 21. No. 2. ACM, 1993, 41 ages.

IBM; "Instruction Steering Policy for Balanced Utilization of a Biburcated Unified Issue Queue"; http://ip.com/IPCOM/000179961D; Mar. 3, 2009, 3 pages.

International Search Report and Written Opinion for International Application No. PCT/IB2018/058800; International Filing Date: Nov. 9, 2018; dated Feb. 27, 2019, 9 pages International Search Report and Written Opinion for International Application No. PCT/IB2018/058801, International Filing Date: Nov. 9, 2018; dated Jan. 21, 2019, 9 pages.

International Search Report/Written Opinion for International Application No. PCT/IB2018/058799, International Filing Date: Nov. 9, 2018; dated Feb. 12, 2019, 9 pages.

(56) References Cited

OTHER PUBLICATIONS

Koufaty et al., "Hyperthreading technology in the netburst microarchitecture." IEEE Micro 23.2 (2003): pp. 56-65.
Martinez et al. "Cherry: Checkpointed early resource recycling in out-of-order microprocessors." Microarchitecture, 2002.(MICRO-35). Proceedings. 35th Annual IEEE/ACM International Symposium on. IEEE, 2002, 12 pages.
Mericas, A.; "Performance Characteristics of the POWER8 Processor"; IBM Corporation, IBM Systems & Technology Group Development; 2014, 26 pages.
Ramírez et al., "Direct Instruction Wakeup for Out-Of-Order Processors," Proc Innovative Architecture for Future Generation High-Performance Processors and Systems, IEEE, 2004, 8 Pages.
Shum et al., "IBM zEC12: The third-generation high-frequency mainframe microprocessor." Ieee Micro 33.2 (2013): pp. 38-47.
Subramaniam et al., "Store Vectors for Scalable Memory Dependence Prediction and Scheduling," Proc of the 12th Intl Symp on High-Performance Computer Architecture, IEEE, 2006, 12 pages.
Tendler, JM. et al.; "POWER4 System microarchitecture"; IBM Corporation, IBM Research & Development; vol. 46, No. 1; Jan. 2002, 21 pages.

\* cited by examiner

HEAD AND TAIL POINTER MANIPULATION IN A FIRST-IN-FIRST-OUT ISSUE QUEUE

BACKGROUND

Embodiments of the invention relate in general to an out-of-order (OoO) processor and more specifically to efficient head and tail pointer manipulation in a first-in-first-out (FIFO) issue queue of an OoO processor.

In an OoO processor, an instruction sequencing unit (ISU) dispatches instructions to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues. The ISU includes one or more issue queues that are used to track the instructions as they get ready to be issued to the instruction units and until they are past a point where they may need to be reissued.

SUMMARY

Embodiments of the invention include methods, systems, and computer program products for implementing efficient head and tail pointer manipulation in a first-in-first-out (FIFO) issue queue of an out-of-order (OoO) processor. A non-limiting example method includes tracking relative ages of instructions in a FIFO issue queue of an OoO processor. The FIFO issue queue is configured to add instructions to the issue queue in a sequential order and to remove instructions from the issue queue in any order including a non-sequential order. The tracking of relative ages of instructions includes maintaining a head pointer to an entry allocated to an oldest instruction in the issue queue, wherein upon removal of the oldest instruction from the issue queue, the head pointer is updated to point to a next sequential location in the issue queue. The tracking of relative ages of instructions also includes maintaining a tail pointer to a location of a last instruction added to the issue queue, wherein upon addition of a new instruction to the issue queue, the tail pointer is updated to point to a next sequential location in the issue queue and the new instruction is inserted at the next sequential location. It is determined periodically whether the tail pointer is pointing to a location that includes an instruction for which continued tracking is needed. The tail pointer is updated to point to a previous sequential location in the issue queue based at least in part on determining that the tail pointer is not pointing to a location that corresponds to an instruction that needs continued tracking.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
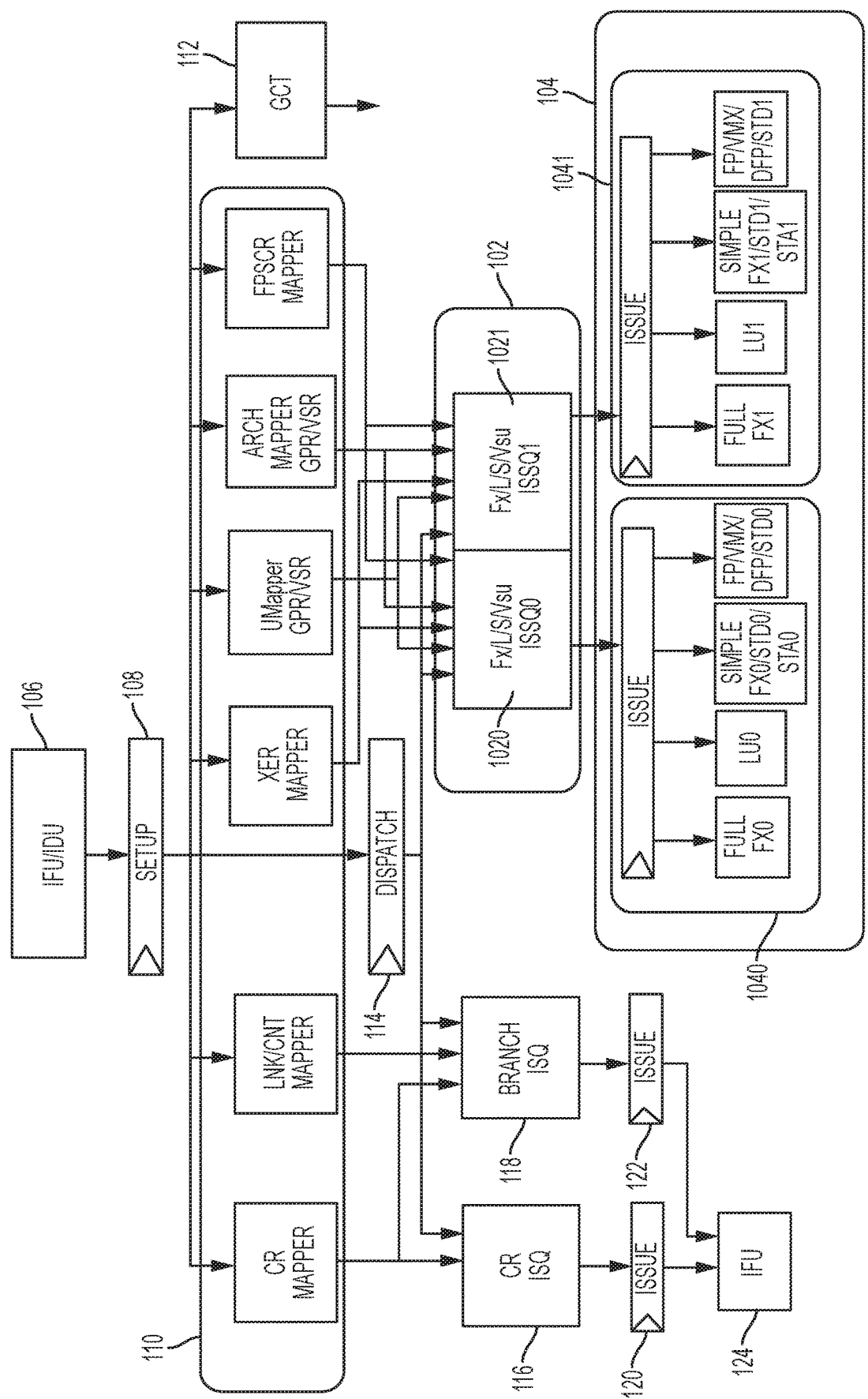
FIG. 1 is a block diagram of a system that includes an instruction sequencing unit (ISU) of an out-of-order (OoO) processor in accordance with one or more embodiments of the invention.

One or more embodiments of the invention described herein provide efficient head and tail pointer manipulation in a first-in-first-out (FIFO) issue queue of an out-of-order (OoO) processor. In accordance with one or more embodiments of the present invention, the head and tail pointers along with the FIFO structure of the issue queue are used, instead of an age array, to track the relative ages of the instructions in the issue queue. Instructions are added to the issue queue in a sequential order at the tail in response to an instruction being dispatched to the issue queue. Instructions are removed from the issue queue once they have issued and it is known that there will not be a need to reissue the instruction at a future time. In an OoO processor the removal of instructions from the issue queue is not limited to occurring in the order that the instructions were received, and removal can occur in any order, including a non-sequential order. Exemplary embodiments of the present invention pertain to the deallocation of queue entries in a FIFO queue upon removal of instructions from the queue.

In accordance with one or more embodiments of the present invention, a head pointer to a location of an oldest instruction in the issue queue is maintained and upon removal of the oldest instruction from the issue queue, the head pointer is updated to point to a next sequential location, or entry, in the issue queue occupied by an instruction. In addition, a tail pointer to a location of a last instruction added to the issue queue is maintained and upon dispatch of a new instruction to the issue queue, the tail pointer is updated to point to a next sequential location in the issue queue and the new instruction is inserted at the next sequential location in the issue queue. Periodically, a check is performed to determine whether the tail pointer is pointing to a location in the issue queue that includes a valid instruction (e.g., an instruction that has not been removed from the issue queue). The tail pointer is updated to a previous sequential location in the issue queue based at least in part on determining that the tail pointer is not pointing to a location that corresponds to a valid instruction. The determining can be performed, for example, based at least in part on an instruction being issued and identified (or about to be identified) as past the issue rejection point from the issue queue or an instruction being dispatched (or about to be dispatched) to the issue queue.

In accordance with one or more embodiments of the present invention, the head and tail pointers track corresponding locations in any table, matrix, array, and/or vector of the issue queue. The head and tail pointers act as indices into these structures and the index value for a particular instruction is typically the same across the structures of the issue queue. For example, the head pointer may point to a second row in a dependency matrix, a second entry in a result available indicator vector, and a second row in a data array which all correspond to the same instruction in the issue queue.

In accordance with one or more embodiments of the present invention, all of the instructions in the issue queue are from a single thread. In accordance with one or more other embodiments of the present invention, the instructions in the issue queue are from a plurality of threads (e.g., two, four). Independent head and tail pointers can be implemented for tracking a relative age of instructions for each thread or for a subset of the threads. The independent head and tail pointers can be used so that a thread (or subset of threads) can be interleaved with and skip over other instructions of other threads that are being managed by other head and tail pointers in the issue queue as long as each set of head and tail pointers doesn't internally lose its FIFO behavior.

Turning now to FIG. 1, a block diagram of a system 100 that includes an instruction sequencing unit (ISU) of an out-of-order (OoO) processor is generally shown according to one or more embodiments of the invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 are shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking all of the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper GPR/VSR, ARCH Mapper GPR/VSR, and FPSCR mapper are input to issue queue 102. As shown in FIG. 1, issue queue 102 tracks issued floating point instructions (Fx), load instructions (L), store instructions (S), and vector-and-scaler unit (VSU) instructions. As shown in the embodiment of FIG. 1, issue queue 102 is broken up into two parts, ISQ0 102O and ISQ1 102I, each portion holding forty-eight instructions. When the processor is executing in ST mode, the issue queue 102 can be used as a single logical issue queue that contains both ISQ0 102O and ISQ1 102I to process all of the instructions (in this example all ninety-six instructions) of a single thread.

When the processor is executing in MT mode, ISQ0 102O can be used to process forty-eight instructions from a first thread and ISQ1 102I is used to process forty-eight instructions from a second thread ISQ1 102I.

As shown in FIG. 1, issue queue 102 issues instructions to execution units 104 which are split into two groups of execution units 104O 104I. Both groups of execution units 104O 104I shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). As shown in FIG. 1, when the processor is executing in ST mode, the first group of execution units 104O execute instructions issued from ISQ0 102O and the second group of execution units 104I execute instructions issued from ISQ1 102I. In alternate embodiments when the processor is executing in ST mode, instructions issued from both ISQ0 102O and ISQ1 102I in issue queue 102 can be issued to execution units in any of the execution units 104O in the first group of execution units 104O and the second group of execution units 104I.

In accordance with one or more embodiments, when the processor is executing in MT mode, the first group of execution units 104O execute instructions of the first thread issued from ISQ0 102O and the second group of execution units 104I execute instructions of the second thread issued from ISQ1 102I.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
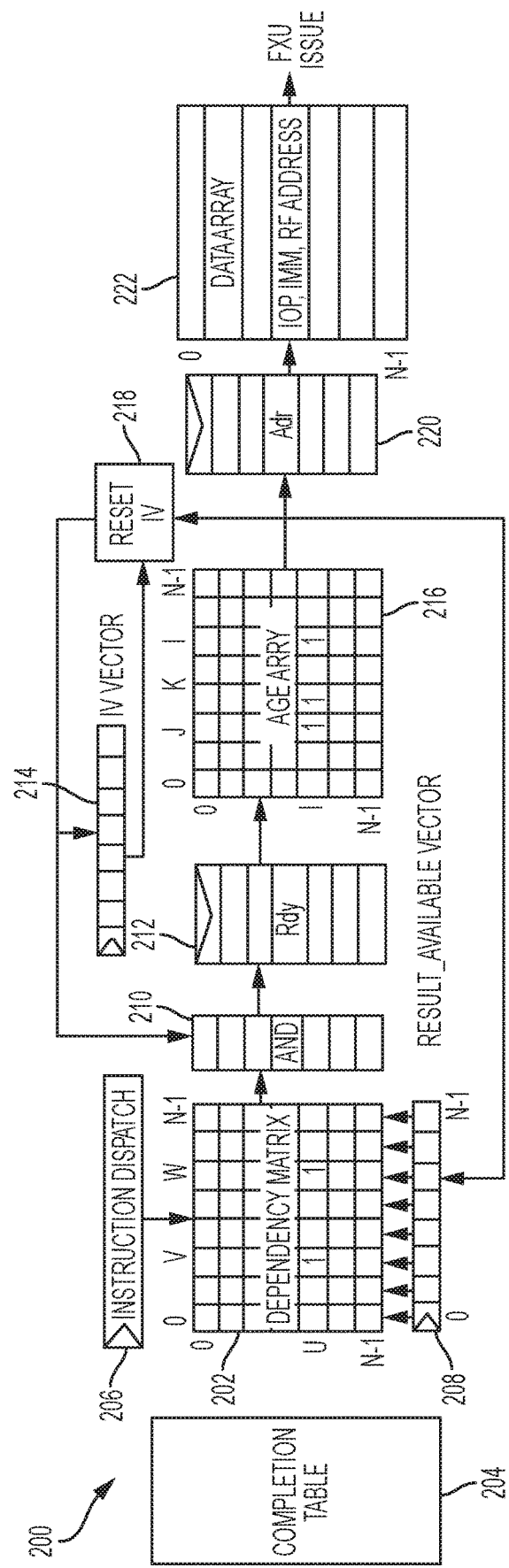
FIG. 2 is a block diagram of an issue queue in an ISU of an OoO processor in accordance with one or more embodiments of the invention.

Turning now to FIG. 2, a block diagram of an issue queue 200 is generally shown according to one or more embodiments of the invention. The issue queue 200 shown in FIG. 2 includes matrices, tables, and vectors for tracking instructions that are waiting to be issued. The matrices and tables each include a corresponding row, or entry, for each instruction being tracked, and the vectors include an entry for instructions being tracked. As the number of instructions in the issue queues continues to increase, the amount of space and power taken up by each of the matrices, tables, and vectors is growing. Embodiments of the invention described herein can be used to eliminate the use of the age array 216 by storing instructions in the order received into the issue queue 200.

The issue queue 200 tracks instructions that are waiting for execution by an execution unit. An instruction is dispatched and added to the issue queue 200 (e.g., CR ISQ 116, Branch ISQ 118, issue queue 102). The instruction is ready to issue from the issue queue 200 when its dependencies are satisfied, that is when the instructions that the instruction is dependent on have issued and their corresponding results are available. The issue queue 200 issues the instruction to an execution unit (e.g., execution unit 104). After issuing the instruction, the issue queue 200 continues to track the instruction at least until the instruction passes a rejection point. The rejection point is different for different instructions and refers to the point where it is known that the instruction will not have to be reissued (e.g., in a read memory operation the rejection point can be passed once the cache is accessed for the read data). Once the instruction has passed the rejection point it can be removed from the issue queue and the entry in the issue queue is deallocated, or cleared, for reuse by a new instruction.

The instruction is "complete" when the instruction is finishing executing in one of the execution units and has passed the point of flushing, and all older instructions have already been updated in the architected state, since instructions have to be completed in order. A flush operation can be performed (e.g., in response to a branch misprediction) to flush (i.e., remove) all or a subset of instructions in the issue queue 102. In the case of a branch misprediction, the flush operation may only flush instructions that are younger than the branch misprediction instruction, as compared to flushing the entire pipeline. Once the instruction is complete, the architected state can be updated with the final state of the data indicating that the instruction has completed. The architected state is updated in order, that is, instructions are completed in order and the completed data updated as each instruction completes.

The issue queue 200 shown in FIG. 2 includes: a dependency matrix 202 for tracking dependencies between instructions in the issue queue 200; a completion table 204 for indicating that the execution of an instruction has passed the rejection point and the instruction can be removed from the issue queue 200; an instruction dispatch unit 206 (e.g., dispatch unit 114 in FIG. 1) for receiving instructions to add to the issue queue; a result-available vector 208 for indicating that all of the instructions that the instruction is dependent on have issued; an IV vector 214 that indicates the instructions that are valid and issuable; AND logic 210 that logically ANDs the output of the dependency matrix with the IV vector 214; a ready vector 212 for indicting that the results from all of the instructions that the instruction is dependent on are available and the instruction is valid and issuable; an age array 216 for tracking the order that the instructions came into the issue queue so that when two or more instructions are ready for execution, older instruction can be selected before newer instruction; a reset IV control 218 for updated the IV state to prevent re-issue of a selected instruction or permit re-issue after rejection; an address 220 used as a read index corresponding to the instruction selected for issue; and a data array 222 containing the text of the instruction that is used by the execution unit for executing the instruction (e.g., an opcode, a pointer to a register file address, immediate data).

As shown in the dependency matrix 202 of FIG. 2 which can track N instructions that are waiting in the issue queue, an instruction at position "u" depends on the instructions at position "v" and "w". The dependency matrix 202 shown in FIG. 2 has N rows and N columns, one row and column for each instruction in the issue queue. As shown in the age array 216 of FIG. 2, instructions at positions "j", "k", and "l" are older than the instruction at position "i".

Figure 3:
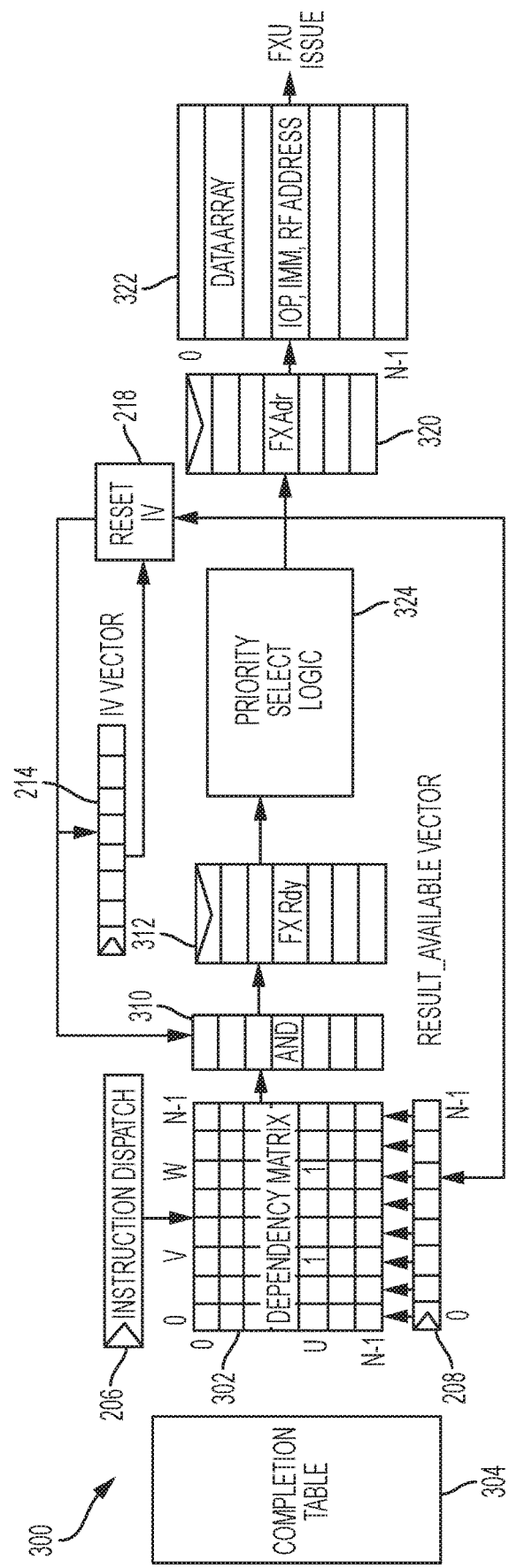
FIG. 3 is a block diagram of a first-in-first-out (FIFO) issue queue in an ISU of an OoO processor in accordance with one or more embodiments of the invention.

Turning now to FIG. 3, a block diagram of a FIFO issue queue 300 in an ISU of an OoO for implementing efficient head and tail pointer manipulation is generally shown in accordance with one or more embodiments of the invention. The issue queue 300 shown in FIG. 3 is similar to the issue queue 200 described above with reference to FIG. 2 except that the instructions are inserted into the matrices, tables, and vectors in FIFO order and there is no need for the logic or circuitry associated with the age array 216 shown in FIG. 2 because the instructions are inserted into the matrices, tables, and vectors in the order that they were received. In place of the age array 216 of FIG. 2, the issue queue 300 shown in FIG. 3 includes priority select logic 324 for selecting between two or more ready instructions based on their relative positions in the issue queue 300. Thus, the dependency matrix 302, completion table 304, AND vector 310, ready vector 312, address 320, and data array 322 contain corresponding entries that are in the order that they were received from the instruction dispatch unit 206.

Instructions in the structures (e.g., tables, matrices, arrays, and/or vectors) of an issue queue such as the one shown in FIG. 3 are typically indexed by a common index. For example, the head pointer may point to a second row in a dependency matrix, a second entry in a result available indicator vector, and a second row in a data array which all correspond to the same instruction in the issue queue. For ease of description, the head and tail pointers will be described herein as pointing to entries in an issue queue issue queue. It should be understood that the head and tail pointers can be index values which also point to corresponding locations in all or a subset of the structures of an issue queue.

Figure 4:
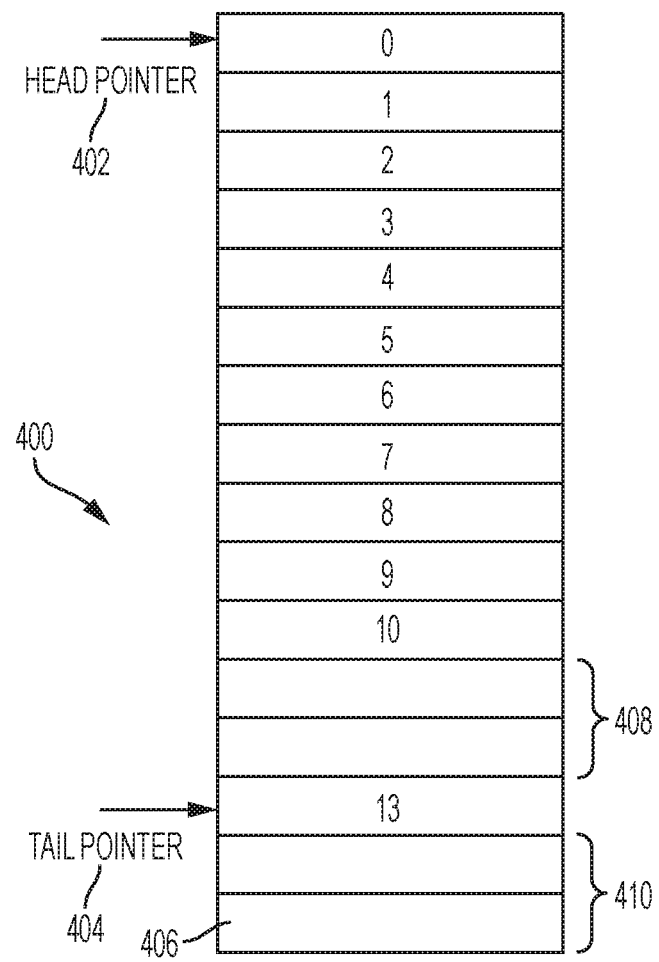
FIG. 4 is a block diagram of head and tail pointers to entries in a FIFO issue queue for a single thread in accordance with one or more embodiments of the invention.

Turning now to FIG. 4, a block diagram 400 of head and tail pointers to entries in a FIFO issue queue for a single thread is generally shown in accordance with one or more embodiments of the invention. As shown in FIG. 4, a head pointer 402 is pointing to a location in an issue queue 406, such as issue queue 300 in FIG. 3, which corresponds to instruction "0". The head pointer 402 points to the entry that corresponds to the oldest instruction in the issue queue 406. FIG. 4 also includes a tail pointer 404 that points to the location that includes instruction "13" which is the instruction that was most recently added to the issue queue 406 (the newest instruction in the issue queue). As shown in FIG. 4, the next two instructions added to the issue queue 406 will be inserted into the next sequential locations 410. Also shown in FIG. 4 are two locations 408 that do not have valid instructions (e.g., previous instructions "11" and "12" have been removed flowing successful OoO issue) that are between the tail pointer 404 and the head pointer 402. Thus, the issue queue 406 has four available slots but only two can be used until after the entry allocated to instruction "0" is deallocated and becomes available for reuse.

Figure 5:
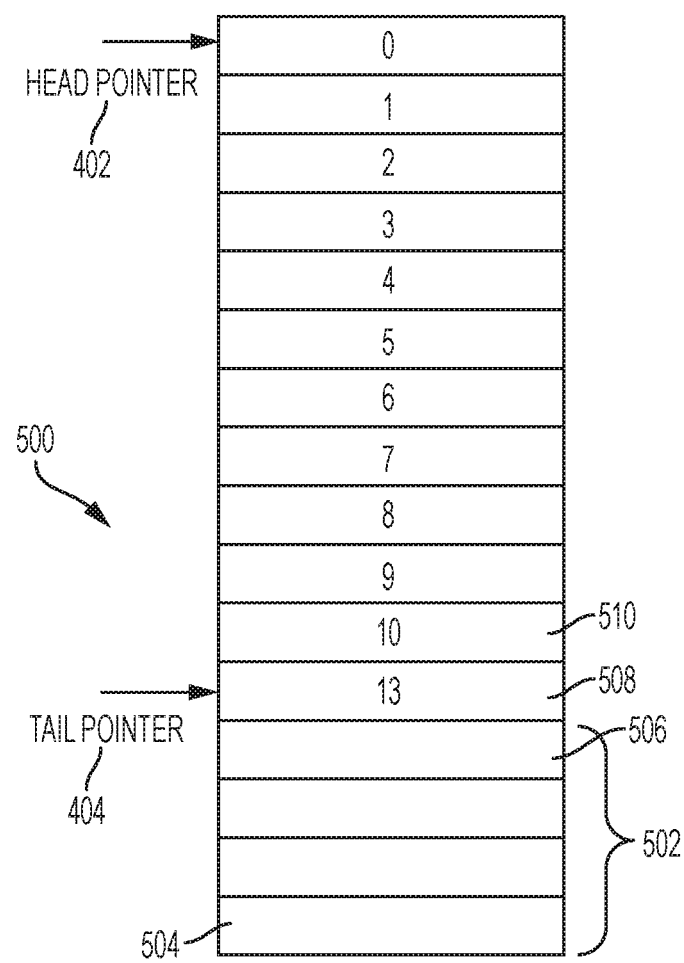
FIG. 5 is a block diagram of head and tail pointers to entries in a FIFO issue queue for a single thread in accordance with one or more embodiments of the invention.

Turning now to FIG. 5, a block diagram 500 of head and tail pointers to entries in a FIFO issue queue for a single thread is generally shown in accordance with one or more embodiments of the invention. As shown in FIG. 5, a head pointer 402 is pointing to a location of the oldest instruction in an issue queue 504 of an issue queue which corresponds to instruction "0". FIG. 5 also includes a tail pointer 404 that points to the location in the issue queue 506 that includes instruction "13" which is the instruction that was most recently added to the issue queue. As shown in FIG. 5, the next four instructions added to the issue queue will be inserted into sequential locations 502 after the tail pointer 404. This is contrasted with the issue queue 406 shown in FIG. 4, where there are two locations 408 in the issue queue 406 that are unusable until after all entries corresponding to instructions "0" through instruction "10" are deallocated.

In the exemplary embodiment of the invention shown in FIG. 5, after instructions "11" and "12" were issued and subsequently removed from the issue queue, and prior to instruction "13" being added to the issue queue, the tail pointer 404 was moved back to reclaim the empty rows left by the deallocation of entries for removed instructions "11" and "12". In accordance with one or more embodiments of the invention, on a periodic basis the location pointed to by the tail pointer is examined to determine whether the location corresponds to a valid instruction. Based at least in part on the location not corresponding to a valid instruction, the tail pointer is moved to a previous sequential location. This process of determining whether the location contains a valid instruction and moving the tail pointer to a next previous sequential location can be continued until the tail pointer points to a location that corresponds to a valid instruction. The periodic basis can be based at least in part on a specified interval and/or it can be based at least in part on an action (e.g., identification of instructions that can be removed from the queue).

For example, referring back to FIG. 5, once instructions "11" and "12" were removed from the issue queue, the tail pointer 404 was pointing to location 506. In accordance with one or more embodiments of the invention, when either a specified time frame elapsed or a specified event occurred, a check is made to determine whether location 506 corresponds to a valid instruction. Because instruction "12" was removed from the issue queue, location 506 does not correspond to a valid instruction and the tail pointer 404 is moved one sequential location back to location 508. A check is then made (e.g., based on the movement of the tail pointer 404 or the specified time frame elapsing or a specified event occurring) to determine whether location 508 corresponds to a valid instruction. Because instruction "11" was removed from the issue queue, location 508 does not correspond to a valid instruction and the tail pointer 404 is moved back one sequential location to location 510. A check is then made to determine whether location 510 corresponds to a valid instruction. Because instruction "10" is still allocated an entry in the issue queue, location 510 does correspond to a valid instruction and the tail pointer 404 is left pointing to location 510. When instruction "13" is added to the queue the tail pointer 404 moves the next sequential location 508 in the issue queue and information about instruction "13" is added at that location 508 in the issue queue 504. In this manner, some or all of the gaps of unusable locations (e.g., location 408 in FIG. 4) can be removed and a larger percentage of the space in the issue queue, when compared to the embodiment shown in FIG. 4, is available for allocating for use by new instructions.

Figure 6:
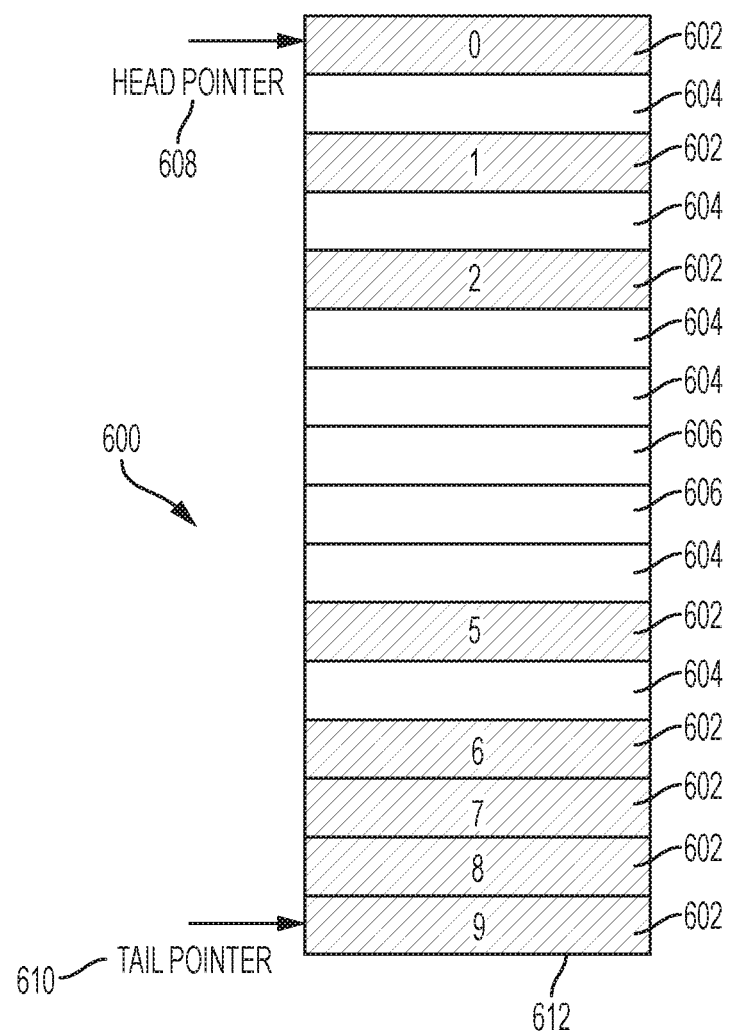
FIG. 6 is a block diagram of head and tail pointers to entries in a FIFO issue queue for multiple threads in accordance with one or more embodiments of the invention.

Turning now to FIG. 6, a block diagram 600 of head and tail pointers to entries in a FIFO issue queue for multiple threads is generally shown in accordance with one or more embodiments of the invention. In the exemplary embodiment of the present invention shown in FIG. 6, instructions from two threads are interleaved and are being tracked in an issue queue 612 using a single head pointer 608 and tail pointer 610 for both threads. Locations 602 in the issue queue 612 currently correspond to instructions in a first thread, the locations 604 in the issue queue 612 currently correspond to locations that previously corresponded to instructions from a second thread that have been removed and are no longer valid, and locations 606 currently correspond to locations that previously corresponded to instructions from the second thread that have been removed and are no longer valid. As shown in FIG. 6, though the issue queue is only fifty percent full it appears, based on the head pointer 608 and the tail pointer 610, that the issue queue is one-hundred percent full. As a consequence, no additional instructions from either thread can be dispatched into the issue queue even through the issue queue is only half full.

Figure 7:
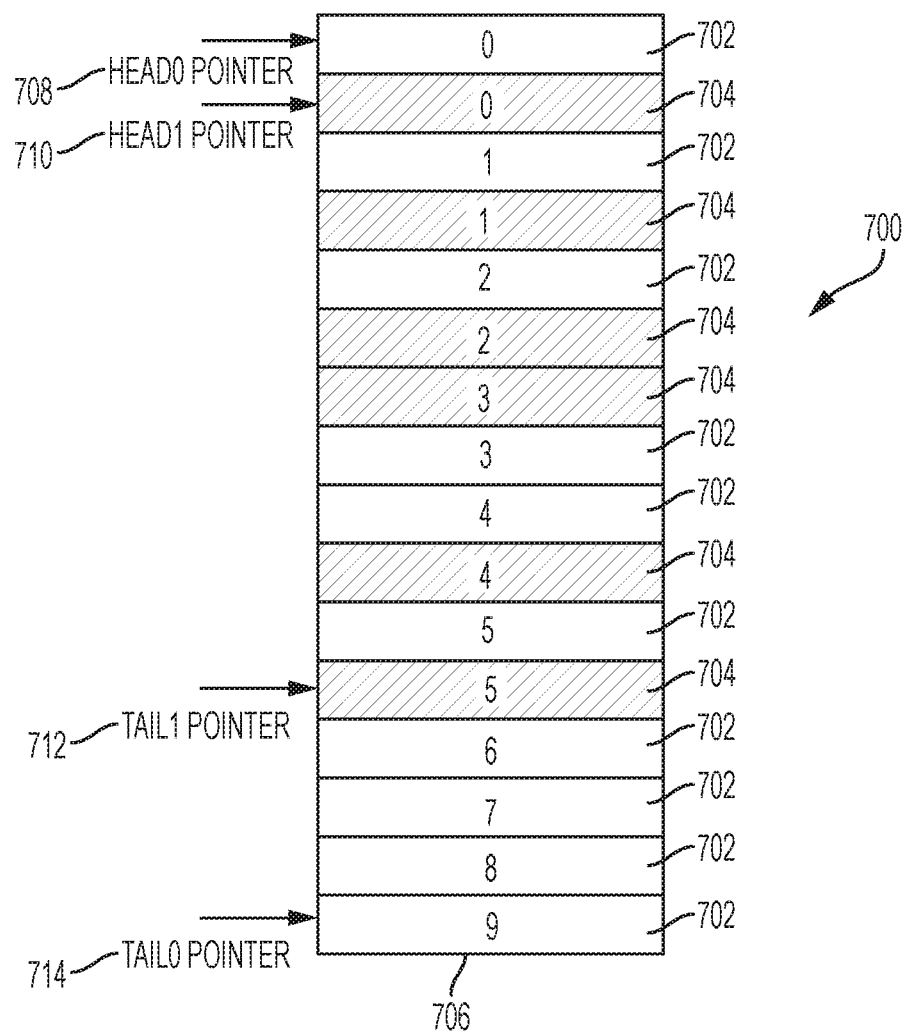
FIG. 7 is a block diagram of multiple head and tail pointers to entries in a FIFO issue queue for multiple threads in accordance with one or more embodiments of the invention.

Turning now to FIG. 7, a block diagram 700 of multiple head and tail pointers to entries in a FIFO issue queue for multiple threads is generally shown in accordance with one or more embodiments of the invention. FIG. 6 depicts head pointer 0 708 and tail pointer 0 714 which correspond to and track instructions currently at locations 704 in an issue queue 706 of the issue queue from a first thread. FIG. 6 also depicts head pointer 1 710 and tail pointer 1 712 which correspond to and track instructions currently at locations 702 in the issue queue 706 of the issue queue from a second thread. The instructions from the first thread and the second thread are interleaved in the issue queue.

Figure 8:
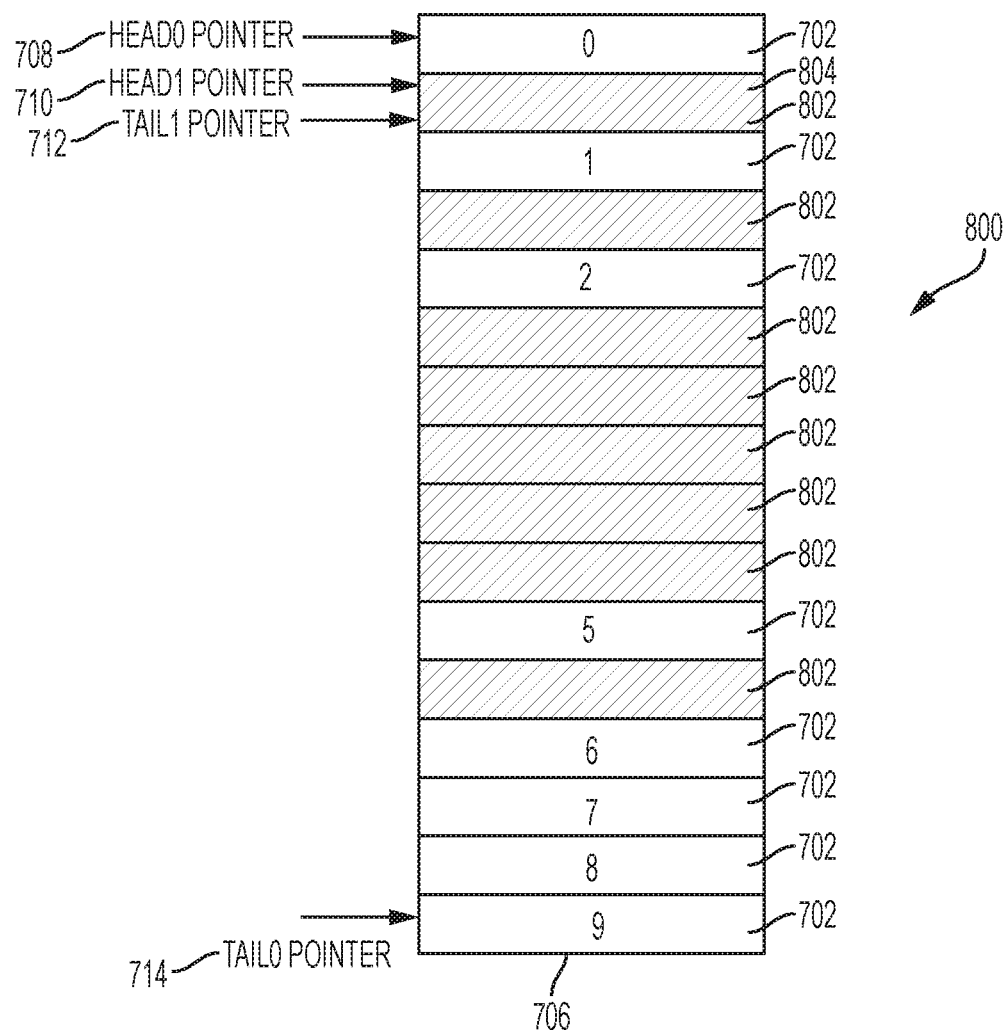
FIG. 8 is a block diagram of multiple head and tail pointers to entries in a FIFO issue queue for multiple threads in accordance with one or more embodiments of the invention.

Turning now to FIG. 8, a block diagram 800 of multiple head and tail pointers to entries in a FIFO issue queue for multiple threads is generally shown in accordance with one or more embodiments of the invention. FIG. 8 shows the embodiment of FIG. 7 after locations 704 in the issue queue 706 from all of the instructions in the first thread have been removed and after instructions "3" and "4" have been removed from their corresponding locations 702 in the issue queue 706. As shown in FIG. 8, the deallocation has freed up locations 802 for new instructions to be added to the issue queue. In accordance with one or more embodiments, after the deallocation of each entry corresponding to a location 704 in the issue queue 706, the tail pointer 1 712 was moved back to the location corresponding to the previously inserted sequential instruction of the first thread or an unallocated location, skipping over locations 702 currently corresponding to instructions of the second thread. As shown in FIG. 8, this results in both the head 1 pointer 710 and the tail 1 pointer 712 pointing to location 804 in the issue queue 706.

Figure 9:
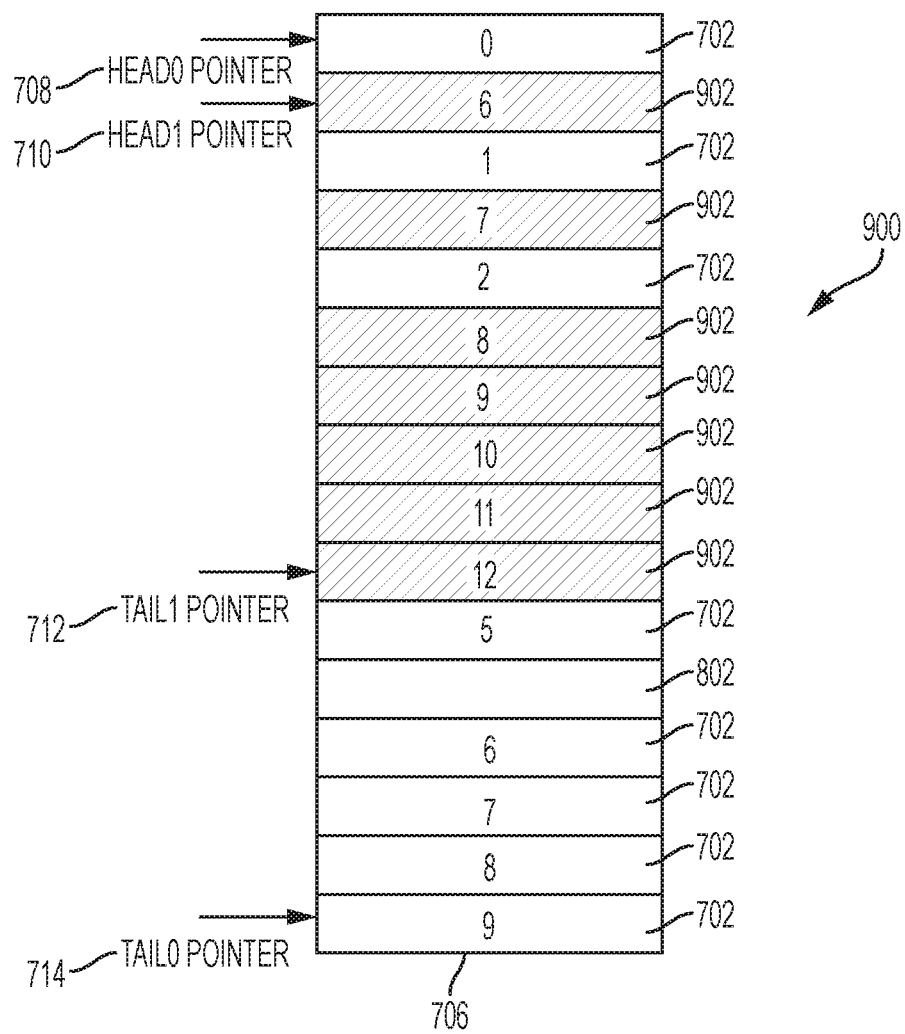
FIG. 9 is a block diagram of multiple head and tail pointers to entries in a FIFO issue queue for multiple threads in accordance with one or more embodiments of the invention.

Turning now to FIG. 9, a block diagram 900 of multiple head and tail pointers to entries in a FIFO issue queue for multiple threads is generally shown in accordance with one or more embodiments of the invention. FIG. 9 shows the embodiment of FIG. 8 after the first thread starts dispatching additional instructions to the issue queue. As shown in FIG. 9, locations 902 for instructions "6", "7", "8", "9", "10", "11", and "12" are allocated in the issue queue 706. As shown in FIG. 9, the tail 1 pointer 712 skips over locations 702 that correspond to instructions from the second thread. When compared to the use of a single head and tail pointer for multiple threads, the use of multiple head and tail pointers can allow more instructions to be tracked in the FIFO issue queue.

Figure 10:
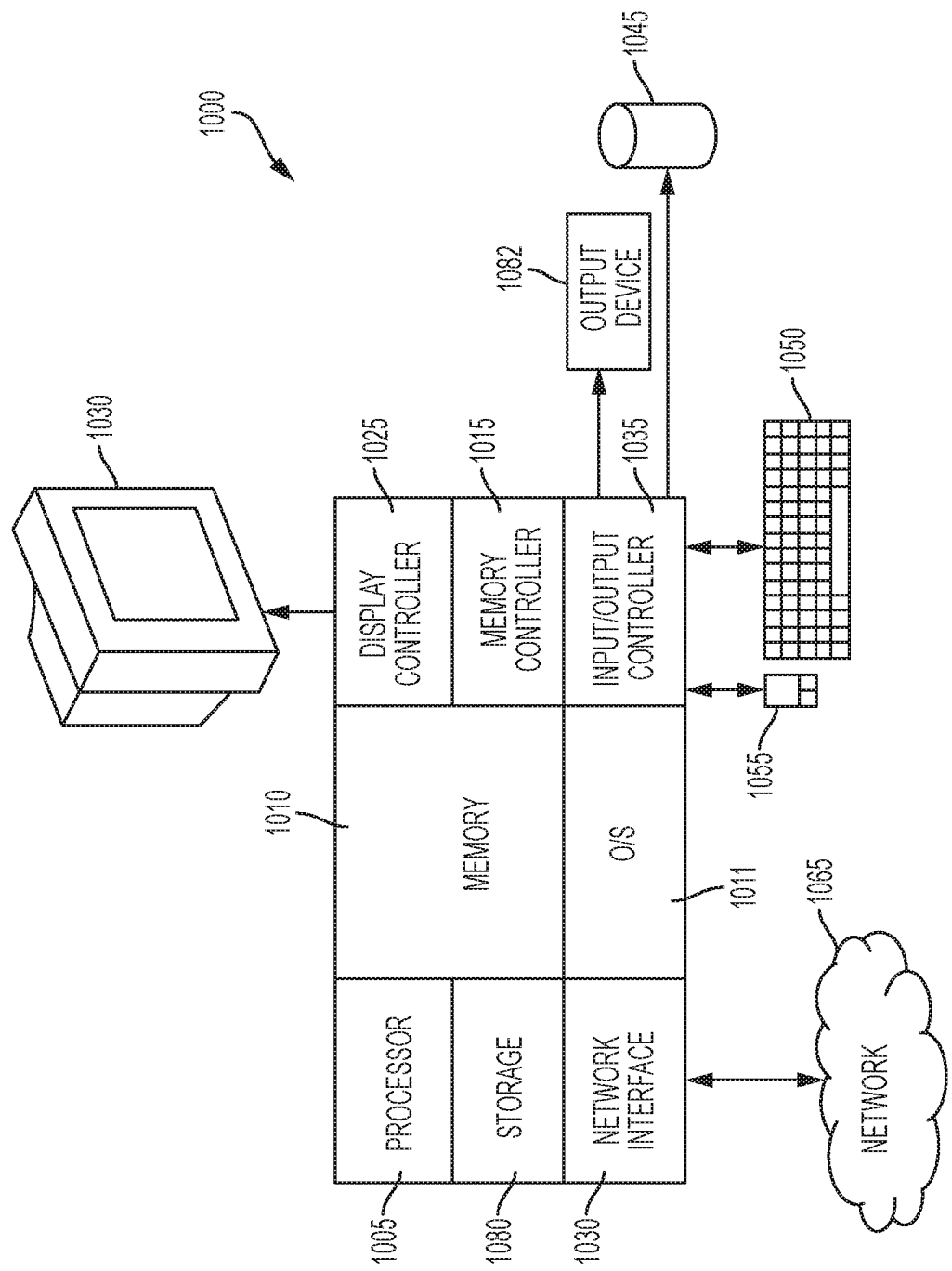
FIG. 10 is a block diagram of a computer system for implementing some or all aspects of efficient head and tail pointer manipulation in a FIFO issue queue of an OoO processor in accordance with one or more embodiments of the invention.

Turning now to FIG. 10, a block diagram of a computer system 1000 for implementing some or all aspects of efficient head and tail pointer manipulation in a FIFO issue queue of an OoO processor is generally shown according to one or more embodiments of the invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 1000, such as a mobile device, personal computer, workstation, minicomputer, or mainframe computer.

In an exemplary embodiment, as shown in FIG. 10, the computer system 1000 includes a processor 1005, memory 1010 coupled to a memory controller 1015, and one or more input devices 1045 and/or output devices 1082, such as peripherals, that are communicatively coupled via a local I/O controller 1035. These devices 1082 and 1045 may include, for example, a printer, a scanner, a microphone, and the like. A conventional keyboard 1050 and mouse 1055 may be coupled to the I/O controller 1035. The I/O controller 1035 may be, for example, one or more buses or other wired or wireless connections, as are known in the art. The I/O controller 1035 may have additional elements, which are omitted for simplicity, such as controllers, buffers (caches), drivers, repeaters, and receivers, to enable communications.

The I/O devices 1082, 1045 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1005 is a hardware device for executing hardware instructions or software, particularly those stored in memory 1010. The processor 1005 may be a custom made or commercially available processor, a central processing unit (CPU), an auxiliary processor among several processors associated with the computer system 1000, a semiconductor based microprocessor (in the form of a microchip or chip set), a macroprocessor, or other device for executing instructions. The processor 1005 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 1010 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1010 may incorporate electronic, magnetic, optical, or other types of storage media. Note that the memory 1010 may have a distributed architecture, where various components are situated remote from one another but may be accessed by the processor 1005.

The instructions in memory 1010 may include one or more separate programs, each of which comprises an ordered listing of executable instructions for implementing logical functions. In the example of FIG. 10, the instructions in the memory 1010 include a suitable operating system (OS) 1011. The operating system 1011 essentially may control the execution of other computer programs and provides scheduling, input-output control, file and data management, memory management, and communication control and related services.

Additional data, including, for example, instructions for the processor 1005 or other retrievable information, may be stored in storage 1080, which may be a storage device such as a hard disk drive or solid state drive. The stored instructions in memory 1010 or in storage 1080 may include those enabling the processor to execute one or more aspects of the dispatch systems and methods of this disclosure.

The computer system 1000 may further include a display controller 1025 coupled to a display 1030. In an exemplary embodiment, the computer system 1000 may further include a network interface 1060 for coupling to a network 1065. The network 1065 may be an IP-based network for communication between the computer system 1000 and an external server, client and the like via a broadband connection. The network 1065 transmits and receives data between the computer system 1000 and external systems. In an exemplary embodiment, the network 1065 may be a managed IP network administered by a service provider. The network 1065 may be implemented in a wireless fashion, e.g., using wireless protocols and technologies, such as WiFi, WiMax, etc. The network 1065 may also be a packet-switched network such as a local area network, wide area network, metropolitan area network, the Internet, or other similar type of network environment. The network 1065 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing efficient head and tail pointer manipulation in a FIFO issue queue as described herein can be embodied, in whole or in part, in computer program products or in computer systems 1000, such as that illustrated in FIG. 10.

The terminology used herein is for the purpose of describing particular embodiments of the invention only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments of the invention were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
tracking relative ages of instructions in a first-in-first-out (FIFO) issue queue of an out-of-order (OoO) processor, the FIFO issue queue configured to add instructions to the issue queue in a sequential order and to remove instructions from the issue queue in any order including a non-sequential order, the tracking comprising:
maintaining a head pointer to a location of an entry allocated to an oldest instruction in the issue queue, wherein upon removal of the oldest instruction from the issue queue, the head pointer is updated to point to a next sequential location in the issue queue;
maintaining a tail pointer to a location of a last instruction added to the issue queue, wherein upon addition of a new instruction to the issue queue, the tail pointer is updated to point to a next sequential location in the issue queue and the new instruction is inserted at the next sequential location;
determining whether the tail pointer is pointing to a location that includes an instruction for which continued tracking is needed, the determining based at least in part in response to a single instruction at the tail pointer issuing and being removed from the issue queue; and
updating the tail pointer to point to a previous sequential location in the issue queue based at least in part on determining that the tail pointer is not pointing to a location that corresponds to an instruction that needs continued tracking.

2. The computer-implemented method of claim 1, wherein the head pointer and tail pointer point to locations in one or both of a dependency matrix of the issue queue that tracks dependencies between instruction in the issue queue and a data array of the issue queue that contains the text of the instructions.

3. The computer-implemented method of claim 1, wherein the issue queue contains instructions from a single thread.

4. The computer-implemented method of claim 1, wherein the issue queue contains instructions from a plurality of threads.

5. The computer-implemented method of claim 4, wherein each of the plurality of threads has its own head pointer and tail pointer for independently tracking the relative ages of instructions within each of the plurality of threads.

6. A system comprising:
a memory having computer readable instructions; and
one or more processors for executing the computer readable instructions, the computer readable instructions controlling the one or more processors to perform operations comprising:
tracking relative ages of instructions in a first-in-first-out (FIFO) issue queue of an out-of-order (OoO) processor, the FIFO issue queue configured to add instructions to the issue queue in a sequential order and to remove instructions from the issue queue in any order including a non-sequential order, the tracking comprising:
maintaining a head pointer to a location of an entry allocated to an oldest instruction in the issue queue, wherein upon removal of the oldest instruction from the issue queue, the head pointer is updated to point to a next sequential location in the issue queue;
maintaining a tail pointer to a location of a last instruction added to the issue queue, wherein upon addition of a new instruction to the issue queue, the tail pointer is updated to point to a next sequential location in the issue queue and the new instruction is inserted at the next sequential location;
determining whether the tail pointer is pointing to a location that includes an instruction for which continued tracking is needed, the determining based at least in part in response to a single instruction at the tail pointer issuing and being removed from the issue queue; and
updating the tail pointer to point to a previous sequential location in the issue queue based at least in part on determining that the tail pointer is not pointing to a location that corresponds to an instruction that needs continued tracking.

7. The system of claim 6, wherein the head pointer and tail pointer point to locations in one or both of a dependency matrix of the issue queue that tracks dependencies between instruction in the issue queue and a data array of the issue queue that contains the text of the instructions.

8. The system of claim 6, wherein the issue queue contains instructions from a single thread.

9. The system of claim 6, wherein the issue queue contains instructions from a plurality of threads, and at least two of the plurality of threads has its own head pointer and tail pointer for independently tracking the relative ages of instructions within the at least two of the plurality of threads.

10. A computer program product comprising a computer readable storage medium having program instructions embodied therewith, the program instructions executable by a processor to cause the processor to perform operations comprising:
tracking relative ages of instructions in a first-in-first-out (FIFO) issue queue of an out-of-order (OoO) processor, the FIFO issue queue configured to add instructions to the issue queue in a sequential order and to remove instructions from the issue queue in any order including a non-sequential order, the tracking comprising:
maintaining a head pointer to a location of an entry allocated to an oldest instruction in the issue queue, wherein upon removal of the oldest instruction from the issue queue, the head pointer is updated to point to a next sequential location in the issue queue;
maintaining a tail pointer to a location of a last instruction added to the issue queue, wherein upon addition of a new instruction to the issue queue, the tail pointer is updated to point to a next sequential location in the issue queue and the new instruction is inserted at the next sequential location;
determining whether the tail pointer is pointing to a location that includes an instruction for which continued tracking is needed, the determining based at least in part in response to a single instruction at the tail pointer issuing and being removed from the issue queue; and
updating the tail pointer to point to a previous sequential location in the issue queue based at least in part on determining that the tail pointer is not pointing to a location that corresponds to an instruction that needs continued tracking.

11. The computer program product of claim 10, wherein the issue queue contains instructions from a single thread.

12. The computer program product of claim 10, wherein:
the issue queue contains instructions from a plurality of threads; and
wherein each of the plurality of threads has its own head pointer and tail pointer for independently tracking the relative ages of instructions within each of the plurality of threads.

* * * * *